(12) United States Patent  
Frazier

(10) Patent No.: US 11,966,505 B2  
(45) Date of Patent: Apr. 23, 2024

(54) ANTI-THEFT COMPUTER HARDWARE AND SOFTWARE

(71) Applicant: Phyllis Frazier, Manhattan, NY (US)

(72) Inventor: Phyllis Frazier, Manhattan, NY (US)

(*) Notice: Subject to any disclaimer, the term of this patent is extended or adjusted under 35 U.S.C. 154(b) by 41 days.

(21) Appl. No.: 17/526,905

(22) Filed: Nov. 15, 2021

(65) Prior Publication Data

US 2023/0153474 A1 May 18, 2023

(51) Int. Cl.
*G06F 21/88* (2013.01)

(52) U.S. Cl.
CPC .................................. *G06F 21/88* (2013.01)

(58) Field of Classification Search
None
See application file for complete search history.

(56) References Cited

U.S. PATENT DOCUMENTS

| | | | | |
|---|---|---|---|---|
| 2007/0005993 A1* | 1/2007 | Jacobs | ................ | G06F 21/88 |
| | | | | 713/300 |
| 2013/0169429 A1* | 7/2013 | Zwisler | ................ | G08B 13/22 |
| | | | | 340/572.1 |
| 2021/0326487 A1* | 10/2021 | Zhou | ................ | G06F 21/31 |
| 2022/0252368 A1* | 8/2022 | Dugo | ................ | F41H 13/0087 |

* cited by examiner

*Primary Examiner* — Trang T Doan

(74) *Attorney, Agent, or Firm* — Lyman Moulton, Esq.; Moulton Patents, PLLC

(57) ABSTRACT

The disclosed Security Hardware/Software simultaneously triggers a mild yet effective shock to the invader's fingers, while completely shutting down the device that is being targeted for hacking. A first system interrupt based on a first unsuccessful login into the computer system, and configured to display a warning message to a user on a screen in communication with a keyboard of the computer system. The deterrent shock is delivered to the user based on the first system interrupt. A second system interrupt based on a second unsuccessful login, and configured to trigger an alarm and lock down computer system devices and inform a law enforcement agency of the second system interrupt. A third system interrupt is based on a third unsuccessful login. The third system interrupt is configured to accept a secure pass code from a vendor of the system to restore the system to a preinterrupt condition.

8 Claims, 5 Drawing Sheets

ANTI-THEFT COMPUTER HARDWARE AND SOFTWARE

BACKGROUND

Identity theft that occurs through electronics remains to be one of the most common types of crime in the country. Criminals can get access to important personal information from devices once stolen; thus, posing extreme threats on an individual's safety and private data. Although some safety software options are available, they often detect suspicious behavior too late and fail to stop the criminal from continuing with their operation before it happens. There have been no products available as original equipment or as an aftermarket to address this problem.

A device or system to prevent theft of personal devices or personal information from being stolen from a user's device. There have been no products available as original equipment or as an aftermarket to address this problem either.

There exists a need for system or apparatus such as this Anti-Theft Hardware and Software, that is not being met by any known or disclosed device or system of present.

SUMMARY OF THE INVENTION

This present invention provides users with a safety software system for electronics that prevents identity theft and security breaches. The Anti-theft Computer Hardware and Software offers an alternative approach that serves to prevent identity theft before it happens to ensure that an electronic device is protected and safeguarded against any form of criminal activity, at all times.

Components, modules, devices and steps of the disclosure include a first system interrupt based on a first unsuccessful login via a user login into the computer system, and configured to display a warning message to a user of the user login on a screen in communication with a keyboard of the computer system. A low voltage and low current anode and cathode disposed adjacent an 'Enter' key of the keyboard configured to deliver a deterrent shock to the user based on the first system interrupt. A second system interrupt based on a second unsuccessful login via the user login, and configured to trigger an alarm and lock down computer system devices and inform a law enforcement agency of the second system interrupt, A third system interrupt is based on a third unsuccessful login via the user login. The third system interrupt is configured to accept a secure pass code from a vendor of the system to restore the system to a pre interrupt condition.

Figure 1:
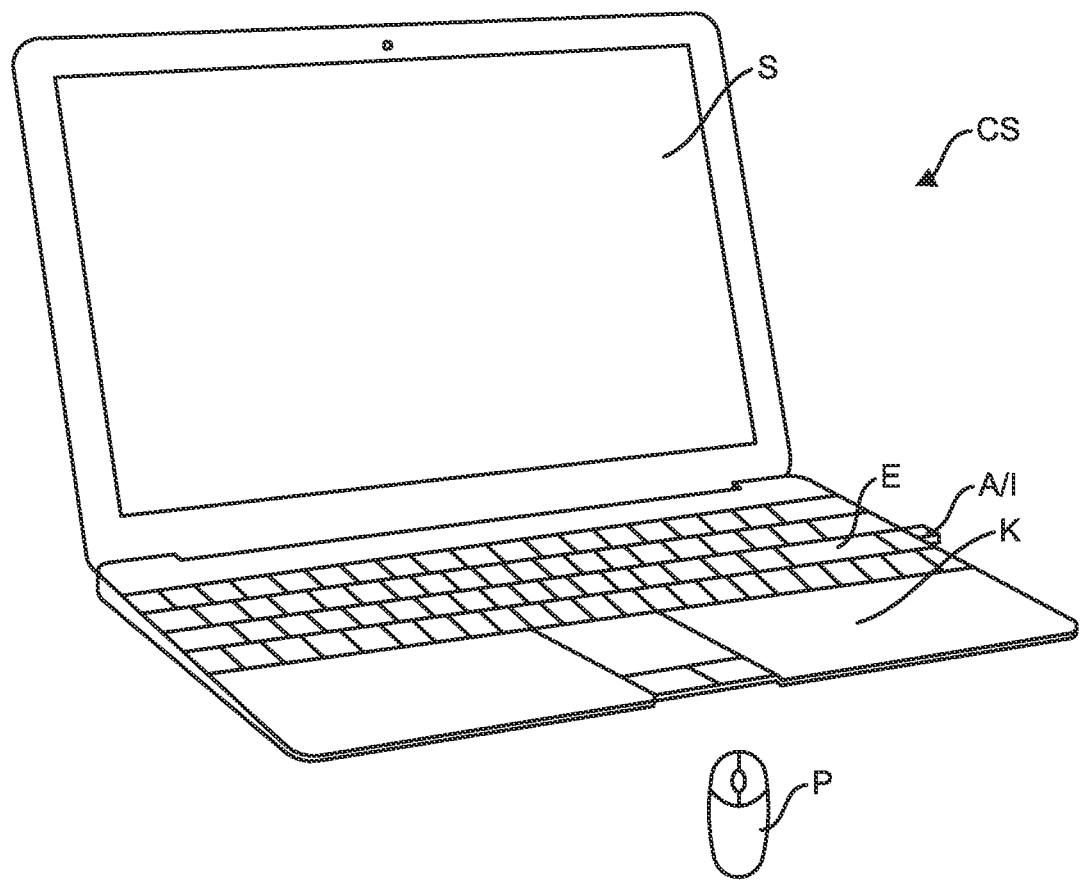
FIG. 1 is a front perspective view of the Anti-theft Computer Hardware and Software, showing a computer system in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front perspective view of the Anti-theft Computer Hardware and Software, showing a computer system in accordance with an embodiment of the present disclosure. The view of the computer system CS includes the screen S, the keyboard K, the Enter key E, the alarm and interrupt A/I and the peripheral P which in this case is a mouse and connect via a USB (Universal Serial Bus) port and wireless electronic circuits in the computer system. The computer system houses a program code for a first, a second and a third interrupts in electronic circuits connected to a USB port on the computer system via adjacent wires and wireless electronic circuits. The connection to the computer system and to the USB port, also includes a connection to a power source for the low voltage and the low current cathode and anode and the alarm.

The present disclosed Anti-theft computer hardware and software, also known as "Security Hardware/Software", introduces a novel hardware that can be easily installed onto a desktop, laptop, or tablet. This cutting edge software detects an incoming security breach and deters thieves from getting into the contents of the device by transmitting a mild electric shock to a person's finger. To further enhance functionality and increase protection levels, the hardware initiates the devices lock-down mode to ensure the criminal is unable to access any information on the laptop, desktop or tablet, post the system recognizing their intent. Security Hardware/Software ensures a fully operational system that not only halts a criminal's deplorable operation, but also ensures personal data stored on the rightful owner's device will remain confidential. This unprecedented program may prove to be essential for all individuals who seek to properly protect their electronic devices and may prove to be essential in the technology industry.

Figure 2:
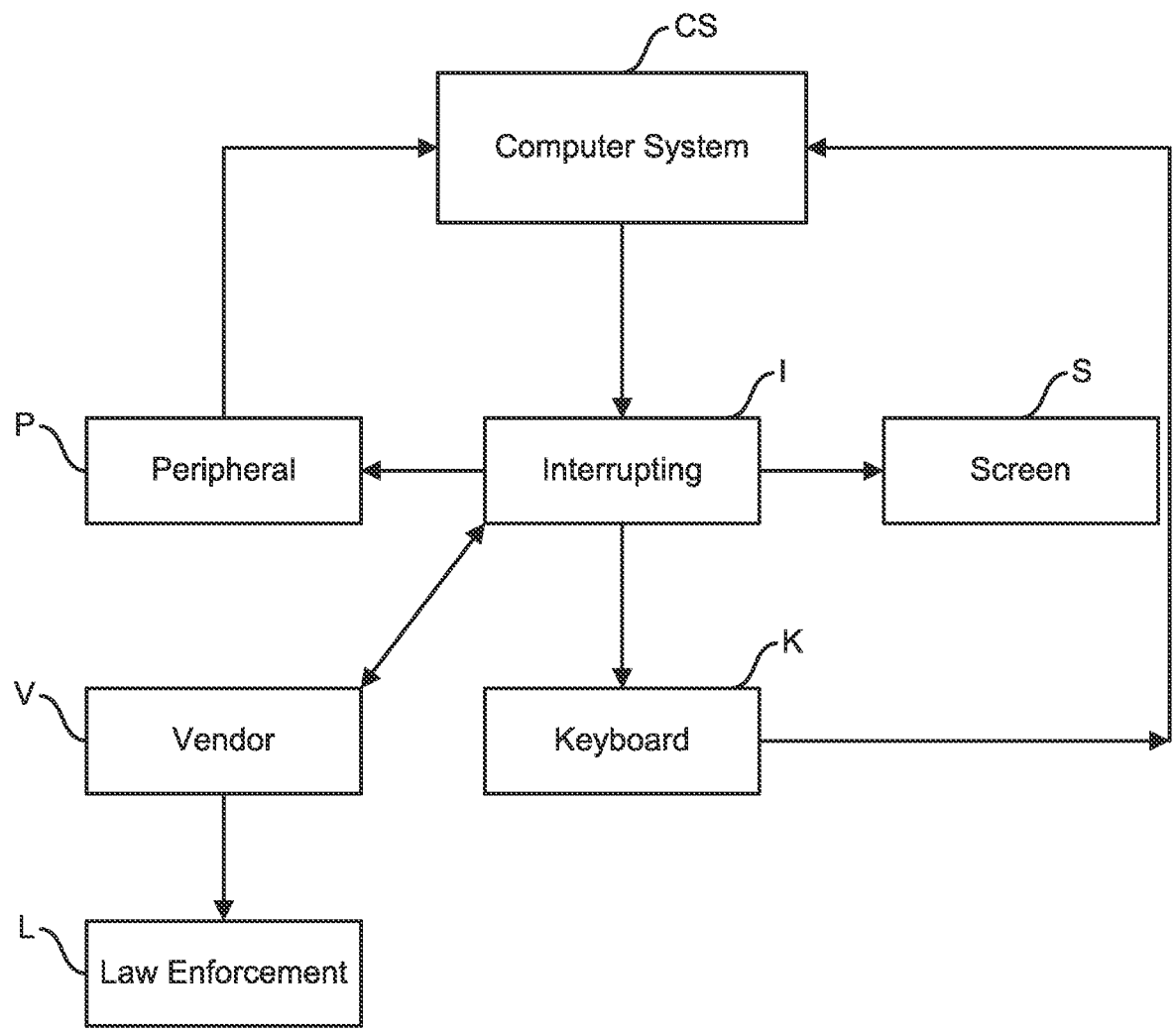
FIG. 2 is a block diagram of the Anti-theft Computer Hardware and Software in accordance with an embodiment of the present disclosure.

FIG. 2 is a block diagram of the Anti-theft Computer Hardware and Software in accordance with an embodiment of the present disclosure. The view includes the computer system CS, the screen S, the keyboard K, the n interrupt I, the peripherals P, the Vendor V and the law enforcement L and the interconnections there between. The n interrupt is wired or otherwise wirelessly connected to all the computer system devices and peripherals and therefore capable of interrupting communications there between.

Figure 3:
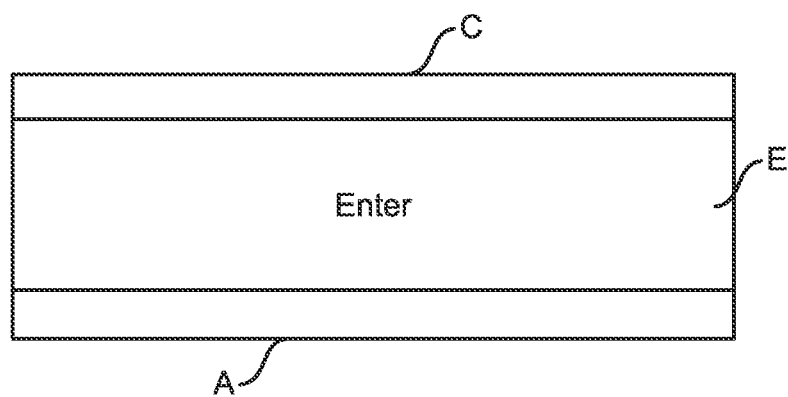
FIG. 3 is a top view of the Enter key of a keyboard with anode and cathode deterrent in accordance with an embodiment of the present disclosure.

FIG. 3 is a top view of the Enter key of a keyboard with anode and cathode deterrent in accordance with an embodiment of the present disclosure. The cathode C and the anode A are either built into the keyboard K or are after factory addons such as conductors fitting between the keys of an OEM (Original Equipment manufacture) keyboard.

Figure 4:
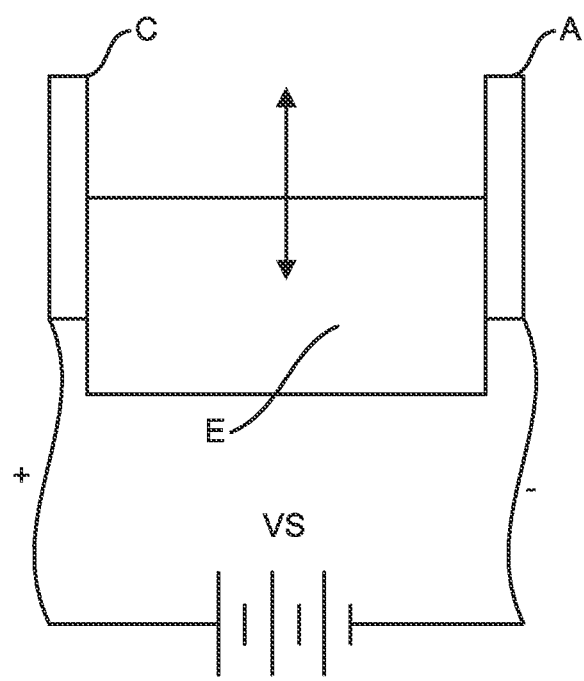
FIG. 4 is a side view of the Enter key of the keyboard with anode and cathode circuit in accordance with an embodiment of the present disclosure.

FIG. 4 is a side view of the Enter key of the keyboard with anode and cathode circuit in accordance with an embodiment of the present disclosure. The cathode C is wired to a positive terminal of a low voltage and low current electricity source such as a 9 volt off the shelf battery. The anode A is wired to the negative terminal of the low voltage and low current electrical source, including direct current and pulsed current and alternating currents as transformed from higher available sources.

Figure 5:
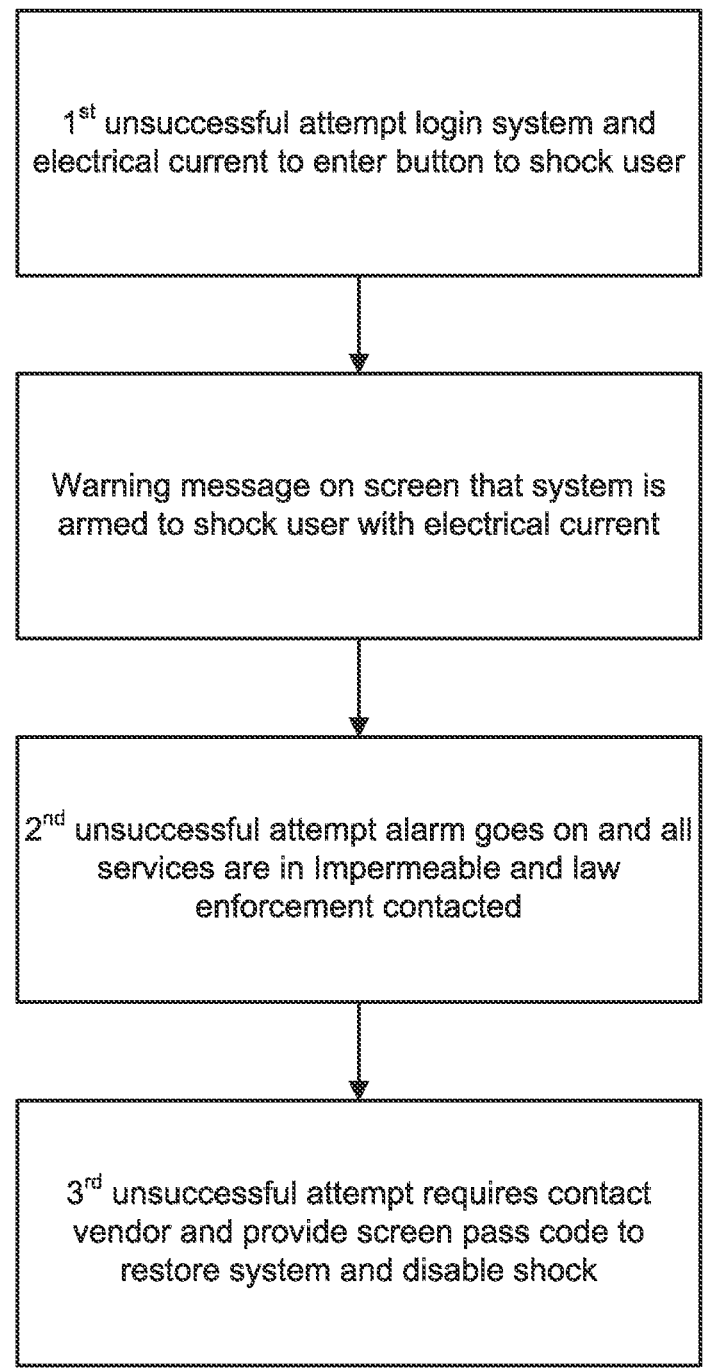
FIG. 5 is a flow diagram of steps for system interrupts coming from unsuccessful logins in accordance with an embodiment of the present disclosure.

FIG. 5 is a flow diagram of steps for system interrupts coming from unsuccessful logins in accordance with an embodiment of the present disclosure. The steps include a first system interrupt based on a first unsuccessful login into the computer system, and configured to display a warning message to a user on a screen in communication with a keyboard of the computer system. A low voltage and low current anode and cathode disposed adjacent an 'Enter' key of the keyboard configured to deliver a deterrent shock to the user based on the first system interrupt. A second system interrupt based on a second unsuccessful login, and configured to trigger an alarm and lock down computer system devices and inform a law enforcement agency of the second system interrupt. A third system interrupt is based on a third unsuccessful login. The third system interrupt is configured to accept a secure passcode from a vendor of the system to restore the system to a pre interrupt condition.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. An Anti-theft device comprising:
    a first system interrupt based on a first unsuccessful login into a computer system via a user login, and configured to display a warning message to a user of the user login on a screen in communication with a keyboard of the computer system;
    a low voltage and low current anode and cathode disposed adjacent an 'Enter' key of the keyboard configured to deliver a deterrent shock to the user of the user login based on the first system interrupt;
    a second system interrupt based on a second unsuccessful login via the user login, and configured to trigger an alarm and lock down of computer system devices and inform a law enforcement agency of the second system interrupt; and
    a third system interrupt based on a third unsuccessful login via the user login, the third system interrupt configured to accept a secure passcode from a vendor of the computer system to restore the computer system to a pre system interrupt condition.

2. The Anti-theft device of claim 1, wherein the second system interrupt further initiates the lock-down mode for all devices attached to the computer system including a laptop, a desktop, a cell phone and a tablet.

3. The Anti-theft device of claim 1, wherein the first, second and third system interrupts interface to the computer system via a Universal Serial Bus (USB) connection and electronic circuits therein.

4. The anti-theft device of claim 1, further comprising a low voltage and low current source of electricity to power the deterrent shock to the user of the keyboard.

5. The anti-theft device of claim 1, wherein the alarm is an audible alarm.

6. The anti-theft device of claim 1, further comprising the computer system configured to house a program code for the first, the second and the third interrupts in electronic circuits and connected to a USB port on the computer system via adjacent wires and wireless electronic circuits.

7. The anti-theft device of claim 6, wherein the connection to the computer system and to the USB port, also includes a connection to a power source for the low voltage and the low current cathode and anode and the alarm.

8. The anti-theft device of claim 1, wherein the secure passcode is shared with a vendor of the computer system at time of installation of the device.

* * * * *